United States Patent [19]

Giannaris

[11] 4,261,644
[45] Apr. 14, 1981

[54] METHOD AND ARTICLE OF MANUFACTURING AN OPTICAL FIBER CONNECTOR

[75] Inventor: Robert J. Giannaris, Santee, Calif.

[73] Assignee: The United States of America as represented by the Secretary of the Navy, Washington, D.C.

[21] Appl. No.: 965,121

[22] Filed: Nov. 30, 1978

[51] Int. Cl.³ .............................................. G02B 5/14
[52] U.S. Cl. ................................................ 350/96.21
[58] Field of Search ................ 350/96.20, 96.21, 96.22

[56] References Cited

U.S. PATENT DOCUMENTS 3,455,625  7/1969  Brumley et al. ................... 350/96.22
3,914,015  10/1975  McCartney ....................... 350/96.22

FOREIGN PATENT DOCUMENTS 1448975  9/1976  United Kingdom .

*Primary Examiner*—Stewart J. Levy
*Attorney, Agent, or Firm*—Richard S. Sciascia; Ervin F. Johnston; Thomas Glenn Keough

[57] ABSTRACT

A nickel-titanium composition alloy connector capable of having a memorized shape is provided that will mechanically splice very thin optical fibers by the application of heat in a self-aligning orientation that achieves maximum coupling efficiency, and which method can be utilized in field installations.

4 Claims, 5 Drawing Figures

METHOD AND ARTICLE OF MANUFACTURING AN OPTICAL FIBER CONNECTOR

BACKGROUND OF THE INVENTION

This invention relates to fiber optic technology, and more particularly to a method and device for mechanically connecting single fibers by use of a nickel-titanium composition alloy.

The recent application of fiber optic technology to the communication field has required the solution of many unique problems inherent in installing and connecting small diameter fiber optical waveguides such as of the order of 5 mils in diameter. Because of the small dimensions of these fibers to be connected, conventional fabrication techniques and materials associated with multi-fiber cables do not readily permit the manufacture of connectors having the required structure nor tolerances to align the fibers so as to minimize the optical energy loss occurring at their juncture, for example, in splice type connections.

Many different types of connectors have been proposed to accommodate optical fiber cables and fibers. Generally, the basic coupling element is a sleeve member having a core diameter slightly larger than the fiber diameter, with the fiber secured within the sleeve by thermosetting resins, such as an epoxy adhesive, which process can require up to an hour to harden and cure. This type of connector is represented by U.S. Pat. Nos. 3,919,037 and 3,810,802. Other coupling elements consist of a block having V-shaped troughs in which the fibers are laid and epoxied, as represented by U.S. Pat. No. 4,029,390.

Another type of optical fiber connector is represented by U.S. Pat. No. 3,455,625 designed for the splice connection of multi-bundle fiber cable. The ends of the cable are inserted into respective ends of a heat shrinkable thermoplastic sleeve. Shrinkage of the plastic sleeve causes the individual fibers in the cable ends to be compressed into a substantially axially aligned position. Flexing of the coupling during installation and use will degrade the optical transmission across the junction.

A distinction must be drawn between the coupling of multi-fiber bundle cables in the order of 150 mils in diameter and in which all fibers in the bundle transmit the same optical information, and the coupling together of single fibers in the order of 10 mils or less in diameter in which each optical fiber must carry an independent set of information. Because of the small dimensions of single fibers, alignment accuracy is critical to minimize optical energy loss at their junction or coupling, as is the physical task of achieving such alignment for such small fibers, especially at field installations.

SUMMARY OF THE INVENTION

A method and device is provided for enhancing the optical transmission efficiency across the junction of small diameter single optical fibers. The method is relatively simple to practice, and can be carried out under field conditions by technicians.

The novel process involves the manufacture of a metal sleeve, in the case of splice connections, from a unique metal called "NITINOL", which is a nickel-titanium composition alloy. This specific metal has the unique property of being able to resume a memorized configuration after it has been mechanically changed in shape.

The process consists of fabricating a sleeve made of the metal "NITINOL" with an inner core diameter slightly less than the outer diameter of the fibers to be coupled. The sleeve is heat treated to establish a memory of the dimensions, and is then cooled to a temperature below its transition temperature. The sleeve is then mechanically expanded to a diameter greater than the diameter of the fibers to receive the respective ends. With the two ends of the cables inserted into and positioned within the respective ends of the sleeve, the assembly of sleeve and fibers is again heated beyond the transition temperature at which time the sleeve collapses back to its memorized shape to clamp and exert a constant compressive force on cable ends. In this manner the cable ends are self-aligned along the sleeve axis and are firmly maintained in the self-aligned orientation.

DESCRIPTION OF THE PREFERRED EMBODIMENT

Figure 1A:
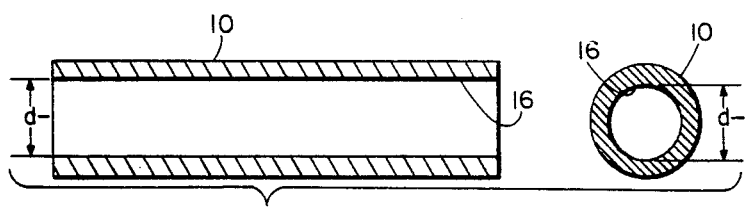
FIG. 1a shows a greatly enlarged optical fiber splicing sleeve made of "NITINOL" material having been annealed to a temperature above the transition temperature to a memorized shape, the inner core diameter being slightly less than the diameter of the fibers to be spliced.

Referring to the drawings where like reference numerals refer to similar parts throughout the figures, there is illustrated in FIG. 1a to FIG. 1d the steps utilized in the method of attaching a rigid metal sleeve 10 to a pair of single optical fibers 12 and 14. Sleeve 10 is made of a unique nickel-titanium alloy composition called "NITINOL" developed at the U.S. Naval Ordnance Laboratory, White Oak, Md., and commonly referred to as the "metal with a memory." The metal composition of "NITINOL" is fully described in U.S. Pat. No. 3,403,238 entitled "Conversion of Heat Energy to Mechanical Energy" issued on Sept. 24, 1968 to W. J. Buehler and D. M. Goldstein. Briefly described, the metal alloy "NITINOL" possesses an inherent capability for drastically altering its atomic bonding, and the forces associated with this bonding, as a function of temperature. The temperature range over which this election bonding change occurs is called the "Transition Temperature Range" or TTR. Each "NITINOL" alloy has an associated TTR based upon its composition, and can be varied in the number of electrons available to perform the bonding function. For example, an alloy composed of a precise one-to-one ratio of nickel and titanium atoms yields a TTR in the range of 310° to 330° F. Progressive lowering of the TTR may be accomplished by altering the nickel-titanium ratio of the alloy in favor of excess nickel. A second method of lowering the TTR is through a direct atom-for-atom substitution of cobalt for nickel. "NITINOL" can be fabricated to have a TTR from −10° C. to 100° C.

One of the inherent characteristics of "NITINOL" is that at temperatures below its TTR, the alloys are highly ductile and may be plastically deformed easily, a condition associated with a "martensitic shear" of the atomic bonding. In a simplified sense, this condition can be likened to applying a shearing force to a stack of playing cards. Thereafter, raising the temperature of "NITINOL" above the TTR causes the formation of strong directional electron bonds that pull the displaced atoms back to their predeformed position, causing recovery of the material to its original condition. It is this characteristic of "NITINOL" which the invention applies in a unique manner for fabrication of optical fiber connectors where axial alignment is an important requirement.

The invention process and article of manufacture is described with reference to FIGS. 1a to FIG. 1d. A "NITINOL" metal sleeve 10 is fabricated having a predetermined percentage of nickel-titanium alloy to provide a TTR suitable for a given environment, and that is sufficient below the operating temperature. Sleeve 10 is formed with a bore diameter 16 (d−) slightly less than the diameter (d) of optical fibers 12 and 14. The conventional single fibers now on the market are fabricated with a diameter from about 4 to 8 mils. Sleeve 10 is then annealed at a forming temperature well above the TTR, such as about 700° C., by any conventional heating method, to set a memory of its shape.

It is characteristic of a part made of "NITINOL" that any alteration of its shape at temperatures below the TTR will not alter its memorized shape. Accordingly, in FIG. 1b sleeve 10 has been expanded at a temperature below the TTR to have a core diameter of d+. A mandril 18 may be inserted into the sleeve bore to ensure that the sleeve will not collapse to its memorized shape during any accidental heating. As the glass fiber illustrated in the preferred embodiment is 5 mils in diameter, mandril 18 for example, can be a piece of conventional piano wire.

Figure 1B:
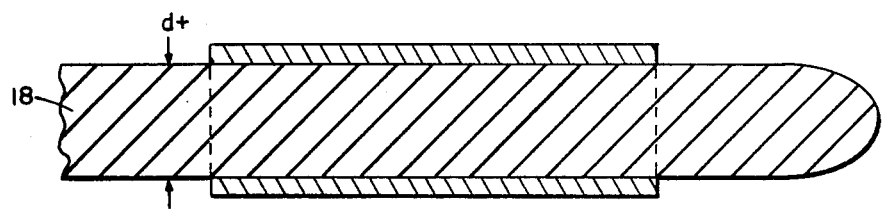
FIG. 1b shows the sleeve of FIG. 1a mechanically expanded to a size for the core diameter to accommodate the single fibers to be spliced, with a mandrel inserted therein to prevent inadvertent collapse of the sleeve.
Figure 1C:
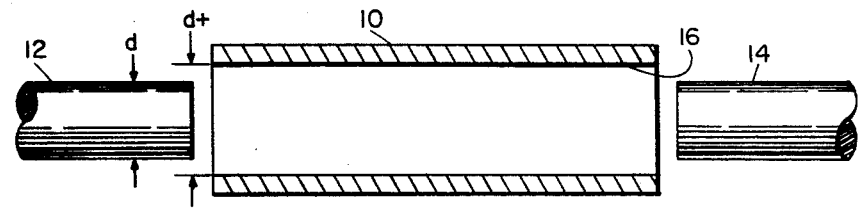
FIG. 1c shows the sleeve of FIG. 1b in a cooled condition with the mandrel removed to enable the fiber ends to be inserted into the respective ends of the sleeve core.

In FIG. 1c, mandril 18 has been removed to enable the ends of fibers 12 and 14 to be freely inserted into and positioned the sleeve bore in a facing but spaced position.

Figure 1D:
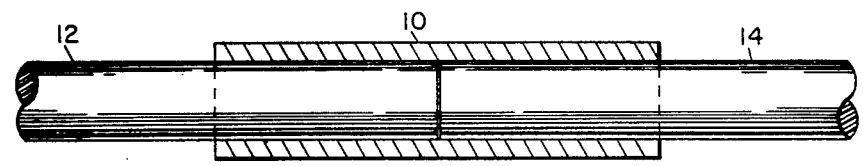
FIG. 1d shows the fiber assembled sleeve of FIG. 1c having been heated above its transition temperature so as to be shrunk back to its memorized shape to clamp the fiber ends securely in a self-aligning orientation.

In FIG. 1d, the sleeve and assembled fiber ends have been heated to a temperature above the TTR. As the assembled sleeve passes through the TTR, the sleeve collapses to its memorized shape around the fibers. As sleeve 10 contracts, it radially clamps the fiber ends uniformly around their periphery to form a tight and secured connection without damaging the fibers. Most important, the fibers are secured together in an axially self-aligned relation that enhances low-loss light transmission, which condition is maintained by the rigid sleeve even when the fibers are bent.

The expansion of sleeve 10 in FIG. 1b can be accomplished by a forming tool. However, in those applications where a very low TTR is chosen, i.e. −10° C., the cooling of the sleeve below such range may cause the sleeve to expand with the bore increasing to a diameter d+ to accept the fiber ends.

Figure 2:
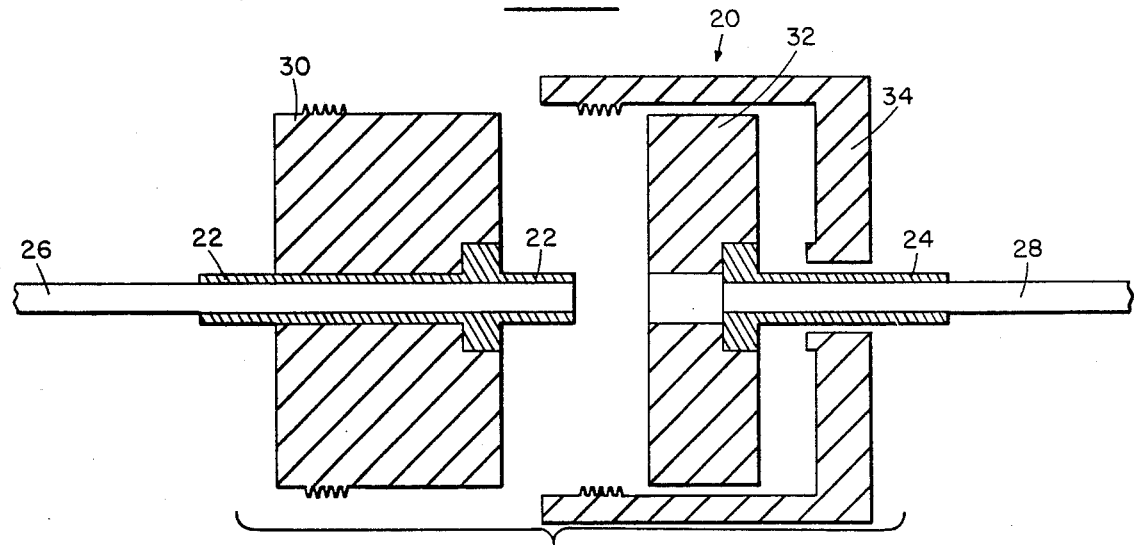
FIG. 2 shows a cross-sectional view of a standard pin-type connector modified to use a fiber mounted "NITINOL" terminal.

In FIG. 2, the invention method is utilized in the fabrication of a standard pin type connector 20. In this arrangement, terminals 22 and 24 are constructed of "NITINOL" and are secured to optic fibers 26 and 28, respectively, by the same process described with reference to FIGS. 1a to 1d. Terminal 22 is mounted in male connector half 30, and terminal 24 is mounted in block 32 housed in female connector half 34. The embodiments of FIGS. 1 and 2 are only illustrative of the various applications in which the novel method and article of this invention may be employed.

The invention provides an easily installed, self-aligning connector for attachment to an optical cable that is suitable for splice and terminal connections. Because the connector sleeve is rigid, the clamped optical fibers in a splice connection are maintained at all times in their axially, self-aligned relation even though the fibers may be subject to bending and vibration.

Obviously many modifications and variations of the present invention are possible in the light of the above teachings. It is therefore to be understood that within the scope of the appended claims the invention may be practiced otherwise than as specifically described.

What is claimed is:

1. A method of splice connecting a pair of longitudinally aligned single optical fibers having a diameter of 10 mils or less comprising the steps of:
   selecting a rigid metal sleeve of uniform core diameter made of a nickel-titanium composition alloy having predetermined transition temperature range and a predetermined core diameter slightly less than the diameter of the fibers to be connected;
   annealing said sleeve at a temperature above its transition temperature range for establishing a memory of its predetermined inside diameter;
   enlarging the core diameter of said sleeve beyond its predetermined diameter to receive the fiber ends;
   inserting each fiber end into a respective end of said enlarged diameter sleeve to near abutting relationship;
   reheating the assembled sleeve and fibers to a temperature above the transition temperature to restore the sleeve core to its predetermined diameter;
   whereby the sleeve shrinks back to its memorized shape to clamp rigidly the ends of the fibers in an optically aligned position.

2. The method of claim 1 wherein is included the step of inserting a mandril into the enlarged diameter sleeve to maintain said enlarged diameter until the fiber ends are ready to be positioned within the sleeve.

3. A metal connector for splicing the ends of optical fibers having a diameter in the order of 10 mils or less comprising:
   a rigid metal sleeve of uniform core diameter made of a specific nickel-titanium composition alloy having a predetermined transition temperature range and being annealing for memorizing a predetermined core diameter after it is enlarged to receive the fiber ends in near abutting relationship, and capable of being restored to its predetermined core diameter upon the application of heat above its transition temperature range for clamping the fiber rigidly therein in a longitudinally aligned position.

4. The connector of claim 3 wherein said connector consists solely of said metal sleeve.

* * * * *